Dec. 22, 1931.   W. J. RANDOLPH   1,837,792
BATTERY CELL PULLER
Filed Aug. 1, 1928   2 Sheets-Sheet 1

INVENTOR.
William J. Randolph
by Parker & Prochnow
ATTORNEYS.

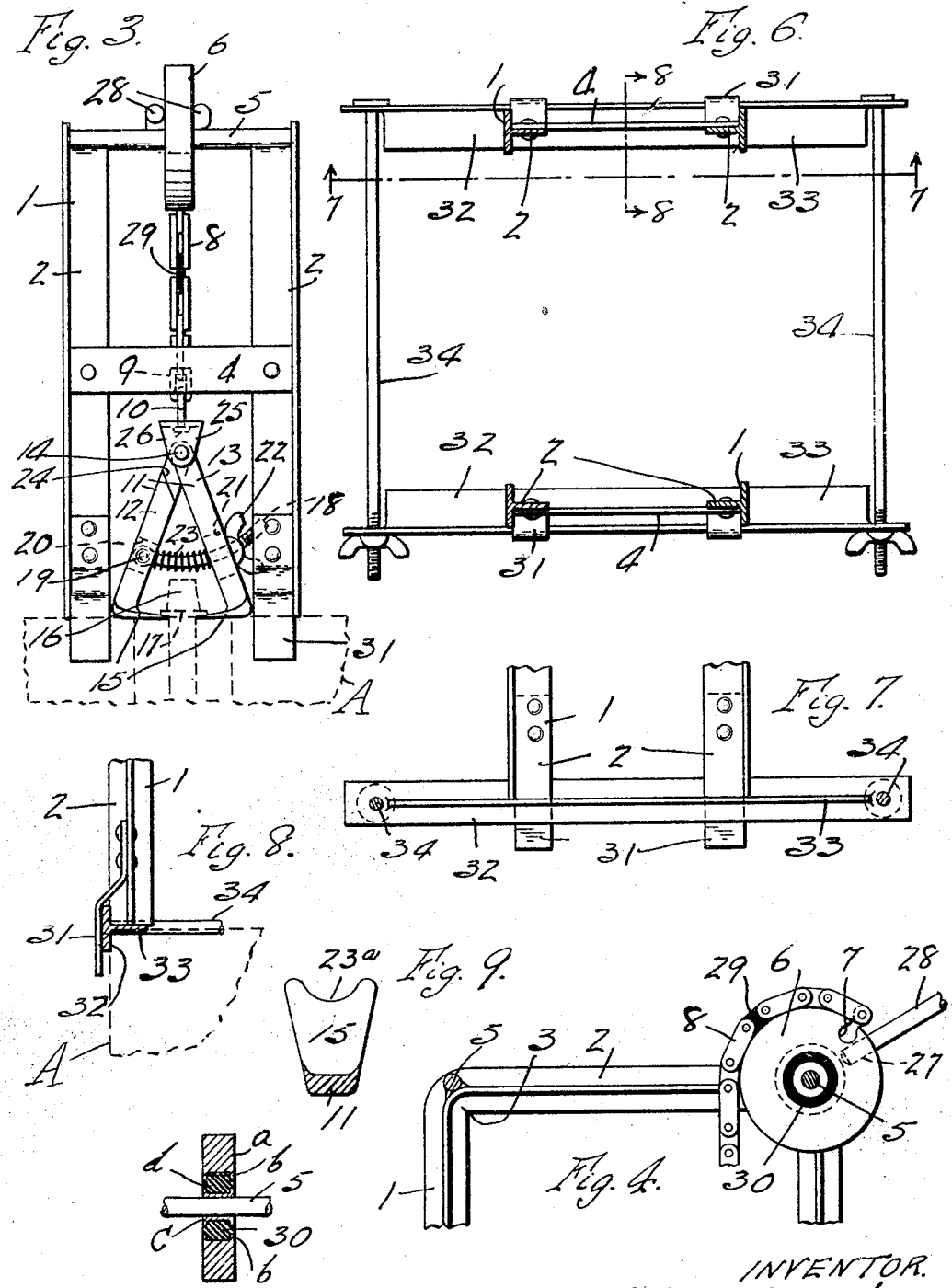

Patented Dec. 22, 1931

1,837,792

UNITED STATES PATENT OFFICE

WILLIAM J. RANDOLPH, OF BUFFALO, NEW YORK, ASSIGNOR TO IVA MAE RANDOLPH, OF BUFFALO, NEW YORK

BATTERY CELL PULLER

Application filed August 1, 1928. Serial No. 296,814.

This invention relates to battery cell pullers such as may be advantageously utilized for lifting or pulling the cells of storage batteries or the like from the casing in which a plurality of such cells are commonly mounted to form the battery.

When batteries are old the cells frequently leak and corrode the casings, with the result that it is extremely difficult to lift or pull the cells from such a casing in order to inspect or repair any particular cell. The cells heretofore have been commonly pulled by hand which is a very difficult, tiring and slow process, and it is frequently necessary to steam or heat the cells in order to loosen them. This heating frequently injures the cells, and also requires considerable time and effort on the part of a workman.

An object of this invention is to provide an improved device for forcibly lifting the cells from a casing in which they are mounted; with which the cells may be lifted from a casing rapidly, with a minimum of effort, and without injury to the cells whether charged or uncharged, and without discharging a cell; which may be quickly and easily placed in operative relation to a cell to be pulled; and which will be relatively simple and inexpensive.

A further object of the invention is to provide an improved battery cell puller which will be universal in that it may be used with substantially all the different makes of batteries for pulling the cells thereof, and which may be set to pull cells of any size or any cell of a group in a casing.

Various other objects and advantages will be apparent from the following description of an embodiment of the invention, and the novel features will be particularly pointed out hereinafter in connection with the appended claims.

In the accompanying drawings:

Fig. 3 is a side elevation of the same;

Fig. 4 is a sectional elevation of a portion of the same, with the section taken approximately along the line 4—4 of Fig. 2;

Fig. 5 is a transverse sectional elevation of one of the lifting discs;

Fig. 6 is a plan of a frame which may be utilized with the puller frame when cells are to be pulled from casings which are very fragile or weak at their open edges;

Fig. 7 is a sectional elevation of the same, with the section taken approximately along the line 7—7 of Fig. 6;

Fig. 8 is a fragmentary, sectional elevation of the same, with the section taken approximately along the line 8—8 of Fig. 6; and Fig. 9 is a sectional plan of the free end of one of the tong arms, the section being taken along the line 9—9 of Fig. 1.

Figure 1:
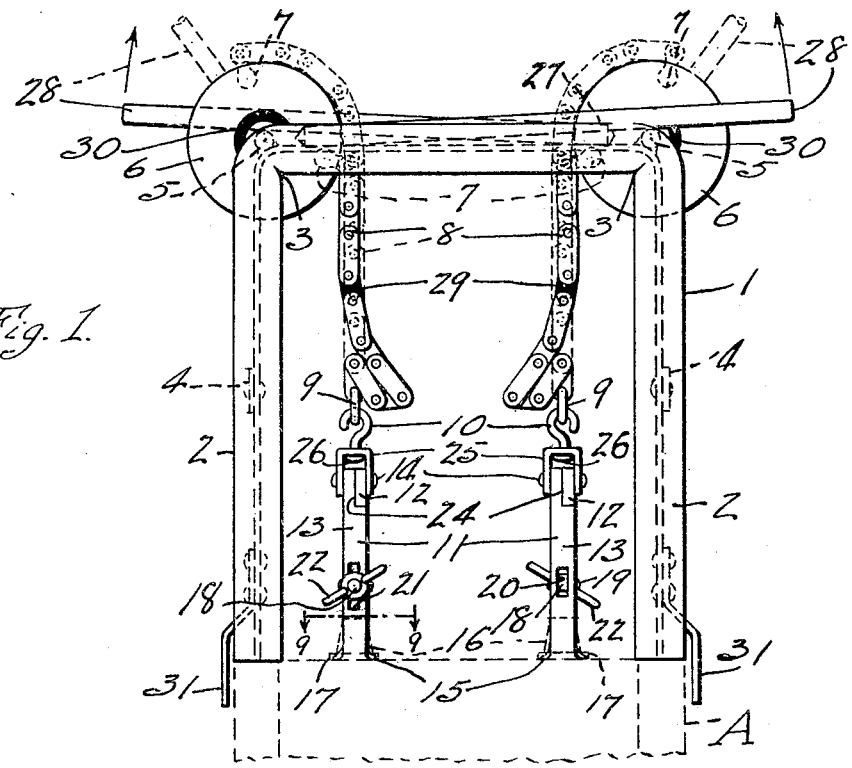
Fig. 1 is a side elevation of a puller constructed in accordance with the invention and illustrated in pulling position over a cell of a battery.

In the illustrated embodiment of the invention, the puller includes a frame 1 with two U-shaped supporting members 2. Each member 2 may be, and preferably is, formed by bending a strip of T-bar into a U-shape, the bending being such that when arranged side by side, the legs of the T's of the two members will extend toward one another in the same plane. To facilitate this bending one of the flanges forming the head of each frame member may be notched, as at 3, and if desired the notch may after bending be filled by pencil or fused metal welding.

The frame members 2 are arranged side by side, but spaced apart a distance greater than the maximum length (measured lengthwise of the battery) of a cell to be lifted, and may be connected by cross bars 4 which extend between, overlap with, and may be suitably connected to the legs of the T's which extend toward one another. These cross bars 4 are preferably arranged some distance above the lower ends of the arms of the frame.

The bases of the U's of the frame may be connected by pivot rods or bars 5 which extend between and connect the legs of the T's at points adjacent the bends in the frame members 2. The pivot rods 5 at their ends are secured to the legs of the T or frame members in any suitable manner, such as by welding the ends thereto. A pair of discs 6 are provided as the lifting elements or members, one disc being mounted on one rod, and the other upon the other rod 5. Both discs are rotatably mounted on the pivot rods 5 and also independently slidable endwise along the rods 5 for a purpose which will appear shortly.

Each disc has an undercut notch or slot 7 cut or formed therein and extending inwardly from its periphery, that is, with the narrow portion of the slot nearest the outer end of the slot. This slot may be conveniently punched in the disc, and may extend from face to face. A suitable flexible cable 8, such as a bicycle or other chain is provided with an enlarged head or end which is secured in the undercut notch or slot 7, with the chain extending outwardly of the disc at the periphery thereof, so that when the disc is rotated, the chain will be wound upon the periphery of the disc.

The chains 8 depend from the discs, and at their lower ends carry eyes 9 which engage with hooks 10 carried by clamping or gripping devices or connectors 11. The gripping devices 11 may be and preferably are in the nature of tongs, each pair being formed of two arms or members 12 and 13, Fig. 3, which are pivoted together by a pin 14.

The free ends 15 of the arms are bent angularly toward one another, and tapered toward the free ends, so as to provide two tapered or wedge-like ends which may be brought toward one another into biting engagement with a terminal 16 of a cell, closely adjacent the upper surface of the cell if necessary, or desirable, such as beneath the nut 17 of the terminal 16.

A clamping rod 18 is pivoted at one end by a pin 19 to one of the arms of the tongs, such as to the arm 12 in a slot 20 thereof, and this rod 18 extends through a slot 21 in the opposite arm of the tongs. This rod 18 may be an arcuate cylindrical rod and threaded at its free end so as to receive a wing nut 22 by which the arms 12 and 13 of the tongs may be drawn toward one another.

A helical spring 23 may be mounted on the rod 18 between the arms or members 12 and 13, so as to be compressed when the arms 12 and 13 are brought together, and to yieldingly urge them apart when the wing nut is unscrewed. The tongs may thus be detachably clamped or gripped to the terminals of the cell to be lifted.

The slots 20 and 21 are elongated lengthwise of the arms 12 and 13 to permit of the swinging of the arcuate rod 18 as the arms are brought together or separated. When the arms 12 and 13 are brought together, the tapered, wedge-like ends 15 will be forced into the metal of the terminals so as to firmly grip the same, and to distribute this gripping around the terminals sufficiently to prevent pulling out of the tongs, the edges of the ends 15 may be made concave, as at 23a, (Fig. 9) so as to contact with the terminal 16 of the cell at a plurality of points around the periphery thereof.

The pivoted ends of the tong arms 12 and 13 may be notched into one another as at 24 so that the angular ends 15 will be in alinement with one another.

A U-shaped member 25 is inverted over the pivoted ends of the arms 12 and 13, and the pivot pin 14 extends through the arms of the member 25, so as to pivot the member 25 to the tongs. The hook 10 extends through the cross part of the member 25 and terminates in a head 26, Fig. 1, so that the hook may swivel in the member 25.

Figure 2:
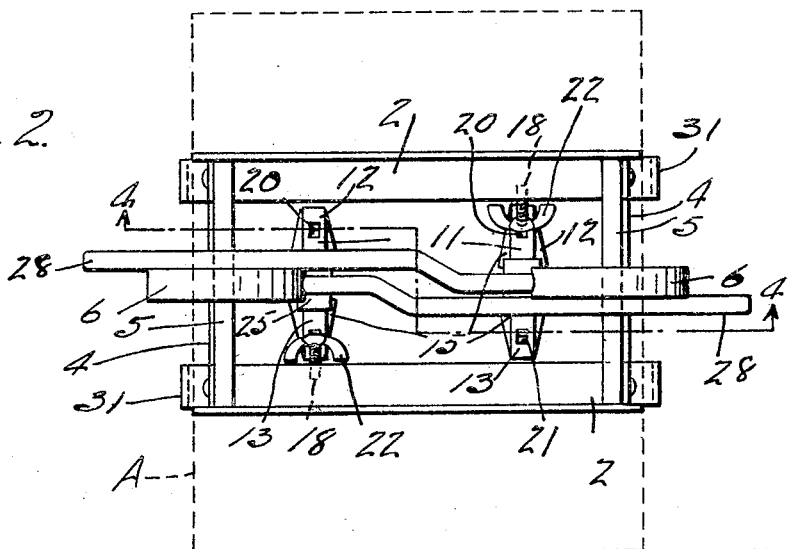
Fig. 2 is a plan of the same.

Each disc 6 is also provided in its periphery with a hole or recess 27 extending radially of the disc for receiving an end of an operating handle 28 by which the disc may be rotated or given angular movement. The free ends of the handles 28 may be offset somewhat as shown in Fig. 2, so as to clear one another and the opposite disc, when the two discs 6 are in alinement with one another as shown in Fig. 2.

Inasmuch as it is often desirable to pull or lift a cell which is charged, without first discharging the cell, provision preferably should be made to prevent discharge of the cell through the lifting mechanism. This may be accomplished in various ways, such as by an insulating link 29 in the chain 8 or by insulating one or both of the discs from the frame. Preferably both means of insulation are used so as to avoid any danger of short circuiting a cell while lifting it.

One or both of the discs may be insulated from the frame by including therein a bushing 30 of insulating material, as shown in Fig. 5. In such a case, the outer annular part a of the disc may be made of metal and have an internal groove b. A spool c of metal may be provided upon the pivot rod 5, so as to take up the wear, and the intermediate space d may be filled with a plastic, subsequently hardened insulating material which fits the grooves of the spool and outer ring a. Obviously, any other manner of providing the insulating bushing for the disc may be substituted.

The various storage batteries now on the market have substantially the same width, considered in the direction between the external terminals of each cell, and the cells vary in their other lateral dimensions in accordance with their capacity or number of plates forming the same. The distance between the two arms of each frame member will correspond approximately with the width of the battery, so that the legs of the frame 1 may rest upon the upper edges of the battery casing, that is upon the side edges of the casing A of the battery. This frame 1 will then bridge or straddle the battery cells and may be shifted along the casing into a position over any cell thereof. The discs 6 may also be shifted endwise along the pivot rods 5 so as to be brought into a position over the terminals of any cell to be pulled.

When the handles 28 are in the position shown in Figs. 1 and 2, they will be resting upon the pivots 5 so as to limit the downward movement of the flexible chains 8. The clamping tongs 11 are first detachably connected to the terminals of the cell to be pulled and then by moving the handles 28 upwardly and toward one another at their free ends, the discs 6 will be rotated in a direction to wind the chains 8 peripherally thereon.

As the chains 8 are wound upon the peripheries of the discs 6, the tongs 11 will be lifted, and by reason of their connection to the cell terminals, they will lift the cell out of the casing, during which lifting, the opposite or thrust reaction of the frame 1 upon the open edge of the casing will prevent the casing from following the cell. By reason of the independent lifting devices connected to each terminal, greater or less force may be applied to either side of the cell so as to lift it evenly and carefully, and without danger of injury to the cell.

In order to prevent accidental displacement of the frame on the open edge of the cell, straps or guides 31 may be secured to the lower part of the frame members 2, with their free ends depending and offset outwardly so as to fit along the outer faces of the sides of the battery casing when the legs of the frame 1 are resting upon the upper edge of the casing. It is not necessary that guides or straps 31 fit closely against the sides of the casing, since they serve merely to aid in positioning the frame 1 to prevent accidentally pushing it laterally sufficiently to remove either side of the frame from the casing, and to guide the frame lengthwise along the battery casing.

In some instances it has been found that the upper or open edges of the battery casing are fragile or weak, especially when the batteries are old. Thus, if the casings are of wood they deteriorate or rot under the action of the acid which is often spilled thereon from the cells, and when pressure is applied by the frame to the edges of such weak casing, the casing often crumbles, making lifting of the cell then difficult.

To provide for such instances, a suitable temporary reinforcement is provided, as shown in Figs. 6–8. For example, two T-bars 32 may be disposed lengthwise of the casing along the side edges thereof, with the leg 33 of the T of each bar resting upon the upper edge of the casing, with part of the head of the T depending along the outer face of the side of the casing, and with the other part of the head extending upwardly as a flange.

Clamping bolts 34 extend between the ends of the T-bars 32 for drawing them toward one another and clamping them firmly to the casing. If desired, the leg of each T may be cut off short at the ends of the bar, to permit of placing the clamping bolts 34 in substantial alinement with the leg of the T.

Otherwise the bolts 34 may be passed through the head of the T slightly below the leg 33.

The frame 1 is then placed upon the reinforced casing with the legs of the frame resting upon the legs 33 of the T-bars 32. The flanges along the sides of the casing then prevent crumbling of the casing, and thus the desired pressure necessary to lift the cell may be applied to the casing through the frame 1 without injury to the casing.

After a cell has been lifted, the tongs may be disengaged and the frame shifted along the casing into a position over another cell to be lifted. The guides 31 fit over the heads of the T's of the bars 32 when the reinforcing frame is used, and in every case the guides 31 will aid in guiding the frame along the battery casing into operative or pulling positions over different cells.

It will be noted that the chains 8 will pull exactly vertically during the entire lifting operation, so that there will be no danger of injury to the cells or the terminals thereof by lateral stresses thereon, the pivot rods 5 being properly placed on the frame so as to properly position the chains in alinement with the terminals.

By providing any desired length for the handles 28, any desired or required pressure may be obtained for lifting the cells. This improved lifter may be quickly and easily placed upon a battery casing, connected to a cell to be pulled, and the cell lifted, without any necessity of heating or otherwise treating the cell or battery casing before or during the pulling of the cell.

The lifting may be gradual or rapid as may be desired, and cannot injure the terminals or the cells since the pull is always exactly vertical.

The tongs may be gripped either upon the upper parts of the terminals or beneath the nuts 17 of the terminals, as may be desired or necessary. The frame is made in a simple manner, of stock rolled metal bars, and the device is relatively inexpensive and compact, occupies a minimum of space and may be used for any battery.

It will be obvious that various changes in the details, which have been herein described and illustrated in order to explain the nature of the invention, may be made by those skilled in the art within the scope and principle of the invention as expressed in the appended claims.

1. A cell puller for storage batteries and the like, comprising a frame of a size to descend over and rest upon the upper open edge of a battery casing beyond the limits of a cell to be pulled, clamps adapted to be detachably connectable to the terminals of said cell to be pulled, a plurality of separate power amplifying devices mounted on said frame above said cell, insulated from one another, and detachably connectible individually to the terminals of said cell, whereby when operating power is applied to said devices, said cell may be elevated through its terminals and said casing will be held by said frame from following said cell.

2. A cell puller for storage batteries and the like comprising a frame of a size to rest upon the upper open edge of a battery casing beyond the limits of a cell to be pulled, four arms hinged together in pairs, the free ends of the arms of each pair being bent angularly toward one another to form tongs, means connecting the arms of each pair to draw them together forcibly and clamp their angular ends firmly to a terminal post of said cell, and means carried by said frame and connected to said tongs for elevating the same.

3. A cell puller for storage batteries and the like comprising a frame of a size to rest upon the upper open edge of a battery casing beyond the limits of a cell to be pulled, lifting means mounted on said frame above said cell and having two pairs of tongs detachably connectible to the terminals of said cell to be pulled, and operable to produce variable pull on either pair, whereby when said lifting means is operated to lift the cell, said frame will hold said casing against movement with said cell.

4. A cell puller for storage batteries and the like comprising a frame of a size to rest upon the upper open edge of a battery casing beyond the limits of a cell to be pulled, a pair of lifting members rotatably mounted on said frame above said cell and separately operable, a flexible cable connected to each of said members to be elevated thereby when each of said members separately of the other is rotated, means for rotating said member, and means connected to the free end of each of said cables and detachably connectible to said cell whereby upon rotation of said members, said cell will be lifted and said frame will hold said casing against movement with said cell.

5. A cell puller for storage batteries and the like comprising a frame of a size to rest upon the upper open edge of a battery casing beyond the limits of a cell to be pulled, a pair of discs individually rotatable on said frame above said cell, a flexible cable connected to each disc and depending therefrom and windable peripherally upon its disc upon rotation of that disc, means for rotating said discs, and separate devices carried by the free ends of said cables for detachably engaging terminals of said cells, whereby upon rotation of said discs said cell will be lifted and said frame will hold said casing against movement with the cell.

6. A cell puller for storage batteries and the like comprising a frame of a size to rest upon the upper open edge of a battery casing beyond the limits of a cell to be pulled, a pair of discs rotatably mounted on said frame above said cell and individually shiftable endwise of their axes of rotation, flexible cables connected to said discs and extending through the peripheries thereof, so as to be wound thereon upon rotation of said discs, means for rotating said discs, and gripping means carried by the depending ends of said cables for detachable engagement with the terminals of said cell.

7. A cell puller for storage batteries and the like comprising a frame of a size to rest upon the upper open edge of a battery casing beyond the limits of a cell to be pulled, a pair of pivot rods mounted on said frame above said cell, a disc rotatably and slidably mounted on each rod, a handle extending from each disc to enable rotation of that disc, a flexible cable connected to each disc at the periphery thereof and depending over said cell, and means carried by the depending end of each cable and detachably connectible to a terminal of said cell, whereby upon rotation of said discs, said cables will be wound thereon and the cell lifted.

8. A cell puller for storage batteries and the like comprising a frame of a size to rest upon the upper open edge of a battery casing beyond the limits of a cell to be pulled, a pair of pivot rods mounted on said frame above said cell, a disc rotatably and slidably mounted on each rod, a handle extending from each disc to enable rotation of that disc, a flexible cable connected to each disc at the periphery thereof and depending over said cell and means carried by the depending end of each cable and detachably connectible to a terminal of said cell, whereby upon rotation of said discs, said cables will be wound thereon and the cell lifted, one of said discs having an insulating bushing between its periphery and its pivot rod for electrically insulating said discs from one another.

9. A cell puller for storage batteries and the like comprising a frame of a size to rest upon the upper open edge of a battery casing beyond the limits of a cell to be pulled, lifting means mounted on said frame and having a depending cable, tongs connected to the depending end of said cable for gripping a terminal of said cell, a clamping element extending between the arms of said tongs for yieldingly urging said arms apart but operable to draw said arms positively toward one another into gripping engagement with a terminal of said cell, whereby when said cable is elevated it will elevate said tongs and thereby said cell.

10. A cell puller for storage batteries and the like comprising two U-shaped frame members having a distance between the arms of each U corresponding to the width of the cell to be pulled, the said width being considered in a direction between the terminal posts of said cell, whereby said frame may rest and be supported upon the open end edge of a battery casing beyond the limits of a cell thereof to be pulled, braces connecting said frame members, and lifting means carried by said frame members and engageable with the terminals of said cell for lifting the same.

11. A cell puller for storage batteries and the like, comprising two U-shaped frame members having a distance between the arms of each U corresponding to the width of the cell to be pulled, the said width being considered in a direction between the terminal posts of said cell, whereby said frame may rest and be supported upon the open end edge of a battery casing beyond the limits of a cell thereof to be pulled, braces connecting said frame members, a rod connecting said frame members adjacent the bases of the U's, a lifting member rotatably mounted on said rod, and means connected to said lifting member and adapted to be detachably engageable with a terminal of a cell to be lifted, whereby upon rotation of said lifting member said cell will be lifted.

12. A cell puller for storage batteries and the like, comprising two U-shaped frame members having a distance between the arms of each U corresponding to the width of the cell to be pulled, the said width being considered in a direction between the terminal posts of said cell, whereby said frame may rest and be supported upon the open end edge of a battery casing beyond the limits of a cell thereof to be pulled, braces connecting said frame members, a pair of rods extending between and connecting said frame members adjacent the bases of the U's thereof, a disc slidable and rotatable on each rod, a flexible cable connected to each disc and windable thereon by rotation of the disc, means carried by each cable and detachably connectible to a terminal of the cell to be lifted, and means connected to each disc for rotating the same and thereby lifting said cell.

13. A cell puller for storage batteries and the like comprising a frame of a size to rest upon the upper open edge of a battery casing beyond the limits of a cell to be pulled, a disc rotatably mounted on said frame and having an undercut slot extending inwardly from its periphery, a flexible cable having a head engaged in the undercut of said slot with the cable extending from the periphery of said disc and depending therefrom, whereby upon rotation of said disc, said cable will be wound thereon, means connected to the depending end of said cable and detachably connectible to the cell to be lifted, and means connected to said disc for rotating the same to lift said cell.

14. A cell puller for storage batteries and the like comprising a frame of a size to rest upon the upper open edge of a battery casing beyond the limits of a cell to be pulled, a disc rotatably mounted on said frame and having an undercut slot extendng inwardly from its periphery, a flexible cable having a head engaged in the undercut of said slot with the cable extending from the periphery of said disc and depending therefrom, whereby upon rotation of said disc, said cable will be wound thereon, means connected to the depending end of said cable and detachably connectible to the cell to be lifted, said disc having a radial hole in its periphery, and a handle detachably engageable in said hole to provide means for rotating said disc.

15. A cell puller for storage batteries and the like, comprising two strips of T-bar, clamping means extending between the heads of the T's of said bars, with the legs of the T's of said bars extending toward one another to rest upon the upper open edge of a battery casing, and with a part of the head of each bar extending along an outer side face of said casing, whereby when said clamping means is tightened, said T-bars will be secured upon the upper end of said casing, and lifting mechanism resting upon the legs of the T-bars extending above a cell to be pulled, and having lifting means detachably engageable with the cell to be pulled.

16. A cell puller for storage batteries and the like comprising a frame having leg portions spaced to rest upon the open edge of a battery casing beyond the limits of a cell to be pulled, and having extensions fitting along the side faces of said casing to prevent lateral displacement of said frame, and lifting means carried by said frame, and detachably engageable with the cell to be pulled for lifting said cell.

17. A cell puller for storage batteries and the like comprising two strips of T-bar each bent into the form of a U, bracing means connecting the corresponding arms of said U's when said frame members are arranged side by side in spaced relation to one another, a pivot rod connected to the legs of the T of said members and a lifting device rotatably supported on said rod and detachably connectible to the cell to be lifted, whereby said cell will be lifted upon rotation of said lifting devices.

18. A cell puller for storage batteries and the like, comprising a frame, a lifting device carried thereby and having a depending flexible connection, a pair of tongs connected to the depending end of said connection, said tongs having wedge-shaped angular ends extending and tapering toward one another with the edges of the wedges concave to fit different portions of the periphery of a cell terminal over which the tongs may be fitted, and means for drawing the arms of the tongs together to grip the cell terminal.

WILLIAM J. RANDOLPH.